United States Patent [19]

Klinkhammer et al.

[11] 4,180,905
[45] Jan. 1, 1980

[54] AUTOMATIC LOADING DEVICE FOR ROLL FILMS

[75] Inventors: Ralf L. Klinkhammer, Cologne; Artur Klotz, Leverkusen, both of Fed. Rep. of Germany

[73] Assignee: AGFA-Gevaert, A.G., Leverkusen, Fed. Rep. of Germany

[21] Appl. No.: 893,086

[22] Filed: Apr. 3, 1978

[30] Foreign Application Priority Data

Apr. 7, 1977 [DE] Fed. Rep. of Germany ....... 2715605

[51] Int. Cl.² .................... B23P 19/04; B23P 21/00
[52] U.S. Cl. ................................. 29/786; 29/806
[58] Field of Search .............. 29/429, 430, 431, 711, 29/714, 720, 783, 786, 793, 806

[56] References Cited

U.S. PATENT DOCUMENTS

| | | | |
|---|---|---|---|
| 3,226,816 | 1/1966 | Wilson et al. | 29/430 |
| 3,364,551 | 1/1968 | Napor et al. | 29/806 X |
| 3,457,627 | 7/1969 | Napor et al. | 29/806 X |
| 3,742,586 | 7/1973 | Butler et al. | 29/430 |
| 3,748,715 | 7/1973 | Hoover et al. | 29/806 X |
| 3,930,296 | 1/1976 | Hoover | 29/430 |
| 4,100,667 | 7/1978 | Napor et al. | 29/429 |

*Primary Examiner*—E. M. Combs
*Attorney, Agent, or Firm*—Connolly and Hutz

[57] ABSTRACT

This invention relates to an automatic device for loading cassettes with roll films, comprising a magazine for roll films, a magazine for cassettes, respective feed devices with separator units for the roll films and the cassettes, a film loading device and a conveying means for carrying off filled cassettes, wherein the film loading device comprises a channel with guides and is arranged along the path of descent of the roll film. A lowerable positioning means is located beneath the channel for the lower cassette section and a pivotable lever with a suction device for handling the upper section is attached to the positioning means.

7 Claims, 12 Drawing Figures

AUTOMATIC LOADING DEVICE FOR ROLL FILMS

This invention relates to an automatic device for loading cassettes with roll films, comprising a magazine for roll films, a magazine for cassettes, corresponding inserting means with separator units, a film loading device and a conveying means for carrying off filled cassettes.

Roll films in cassettes are used in large numbers. They consist of a wound film having a paper leader. The beginning of the film is fixed to the paper leader which after further winding is introduced as a tongue into the core of a spool for taking up the exposed film. This so-called roll film is placed in a hermetically sealed cassette having a film exposure gate.

In the past, the roll film was placed manually in an open lower cassette section which was then closed with an upper cassette section. However, the use of a manual process is not economically feasible when using large quantities. Furthermore, loading has to be carried out in darkness, thus making it more difficult to insert the roll film, and also making it not very acceptable to the human operatives.

An automatic loading device for roll films is desirable which allows a roll of film, which is liable to twist and has a spool which is only joined thereto by a thin paper leader, to be automatically, rapidly and reliably inserted into a light-tight cassette consisting of a lower cassette section and an upper cassette section. In accordance with the invention there is provided an automatic loading device for loading cassettes with roll films, comprising a magazine for roll films, a magazine for cassettes, a respective feed device with separator units for the roll films and the cassettes, a film loading device and a conveying means for carrying off filled cassettes, wherein the film loading device comprises a channel with guides and is arranged along the path of descent of the roll film, the channel having in its lower section controlled flaps which are pivotal downwards and outwards and having a plunger which is lowerable into the channel, the distance between the plunger and the flaps being constrained to be always somewhat larger than the corresponding solid measure of the interposed roll film, and wherein a lowerable positioning means is located beneath the channel for the lower cassette section and a pivotal lever with a suction device for handling the upper cassette section is attached to the positioning means.

The advantage of the automatic loading device is that the roll film, in spite of its instability, is guided precisely and reliably during the loading process by rigid guides, so that it can be inserted into the cassette automatically. All movements are very simple, thus increasing the reliability of operation. The simple structure and the easy accessibility facilitate maintenance, adjustment and control. Moreover, the play of the roll film between the flaps and the plunger during the downwards movement prevents the roll of film or the spool from being twisted by friction when sliding downwards. With the moving roll film which tends to spring out, this movement could in fact lead to a false position in the cassette so that it would no longer function properly during exposure.

In a particular embodiment, at least two opposing vertical guides in the inserting channel project into the region of the descending paper leader.

The width of paper is easily bent up at the edge by the guides projecting into the region of the descending paper leader just before the roll, and held in such a way that the roll of film cannot be deflected despite the downwards movement. Contrary to the general belief of those skilled in the art, the paper leader is not damaged, as has already been adequately demonstrated in practice.

In another embodiment, the plunger has a bevel at the bottom for twisting the spool on the flattened spool core.

The bevel of the plunger is placed on the flattened area of the core when the plunger is lowered and rotates the core until the bevel of the plunger and the flattened area of the core lie parallel. This defined position of the film spool ensures that if the paper leader is placed too far through the core, the leader is rotated before the upper cassette section is placed in the lower cassette section, until it can no longer be squeezed at the edge.

In another embodiment, two parallel retractable levers which are pivotal from above are arranged in the channel for transferring the roll film horizontally from the separator unit, each retractable lever being longer than the longest perpendicular distance between the sliding plane of the roll film and the rotational axis of the retractable lever.

The extended lever arm which travels into a recess in the sliding surface ensures that the lower winding of the roll are also correctly inserted, despite the movement of the end of the retractable lever over an arc of a circle.

The invention is described below with reference to the accompanying drawings in which.

Figure 1A:
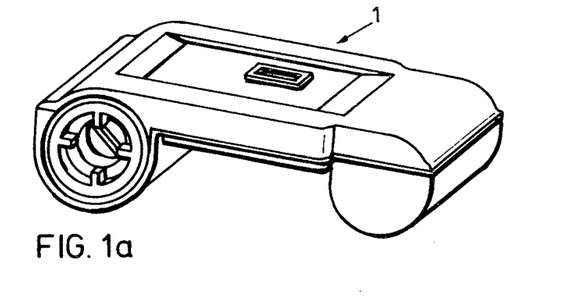
FIGS. 1a, 1b, 1c and 1d are perspective views showing a loaded cassette, an upper cassette section, a roll film and a lower cassette section, respectively.
Figure 1B:
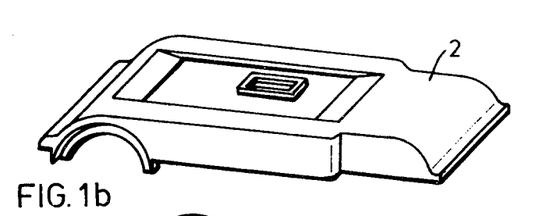
Figure 1C:
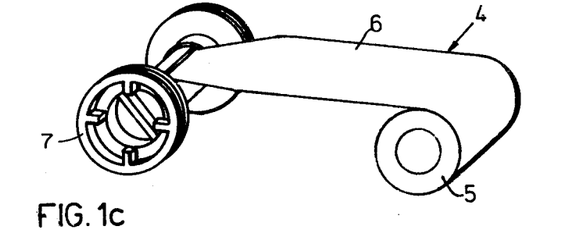
Figure 1D:
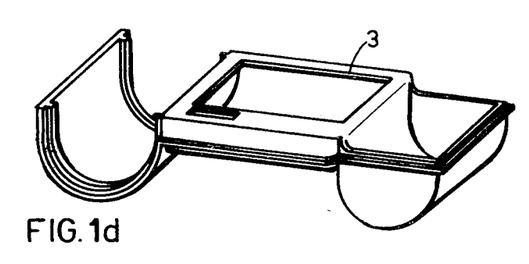

FIGS. 1a,b,c and d show a filled cassette 1 comprising an upper cassette section 2, a lower cassette section 3 and a roll film 4 which consists of a wound film 5, a leader 6 and a spool 7.

Figure 2:
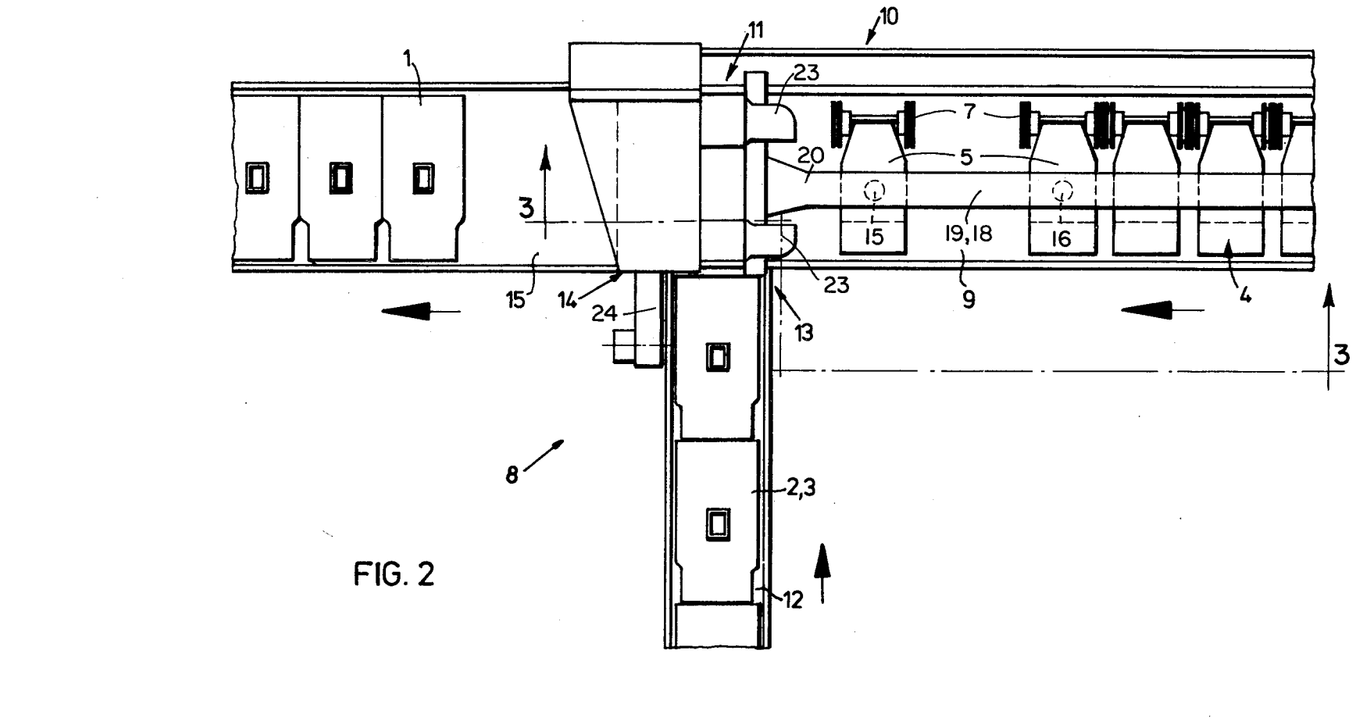
FIG. 2 shows a loading unit in plan view.

FIG. 2 is a plan view of an automatic loading device 8 which comprises a belt 9 for supplying the roll films 4 and extending via a separator unit 10 to a channel 11. Another belt 12 for supplying empty closed cassettes 2, 3 is arranged at right angles to the belt 9 and at a lower level so as to end beneath the channel 11 in front of positioning means 13 (shown in FIGS. 3, 4, 7–9) adapted for lifting, into which positioning means 13 a slide 31 may in turn be introduced which forms part of a separating means (shown in FIGS. 4, 6 and 9) for introducing an empty cassette 2, 3 at the same time as the filled cassette 1 is ejected on to a belt 15 as shown in FIG. 9.

Figure 3:
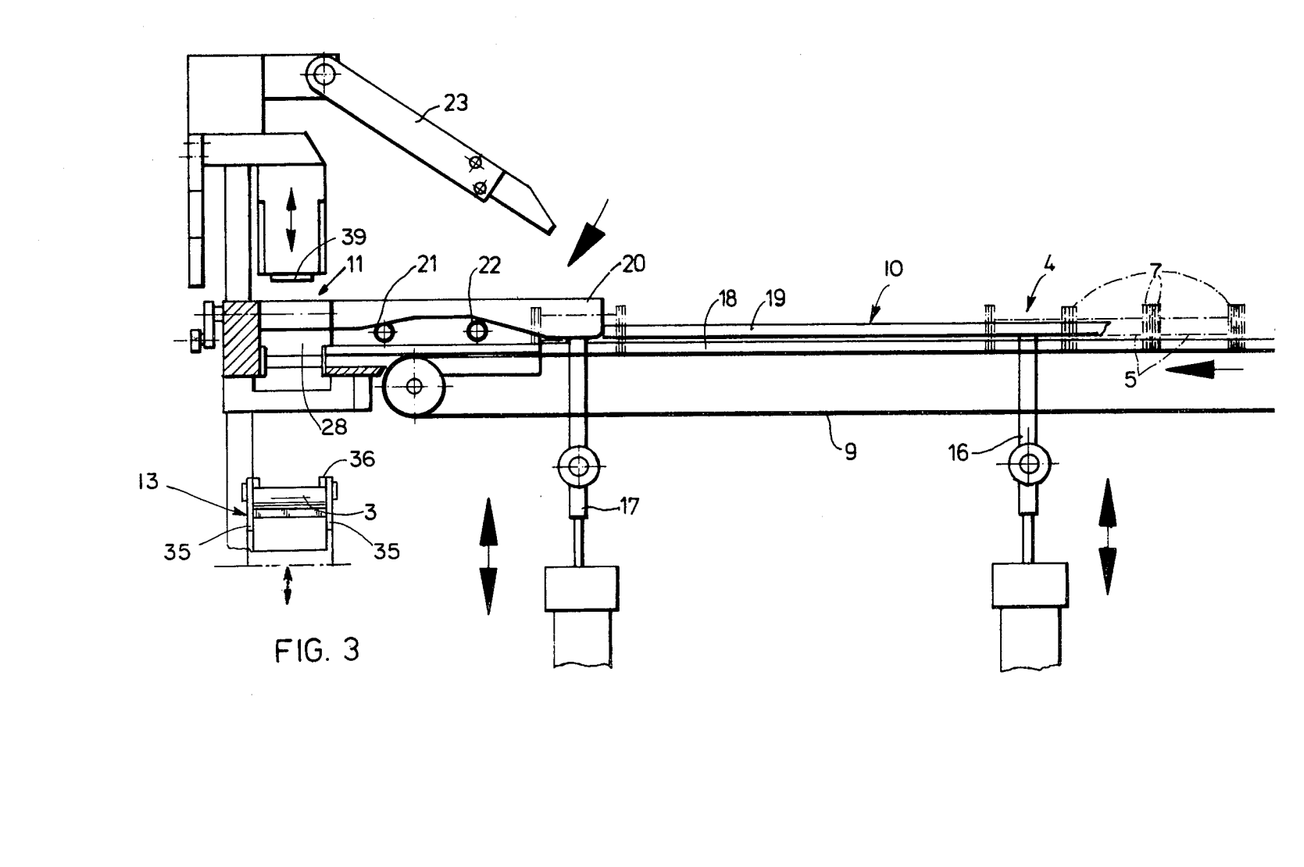
FIG. 3 shows a cross-sectional elevational side view of the loading unit, and a roll film supply device taken along line 3—3 of FIG. 2.

FIG. 3 shows the separator unit 10 of FIG. 2 for separating the rolls of film 4 on the belt 9, the unit comprising a preliminary stop device 16, a main stop device 17 and lower and upper guide rail 18, 19 and 20. Two light barriers 21, 22 are arranged at the end of the belt 9 to provide signals to a retractable lever 23 to cause it to push a roll film 4 into the channel 11.

Figure 4:
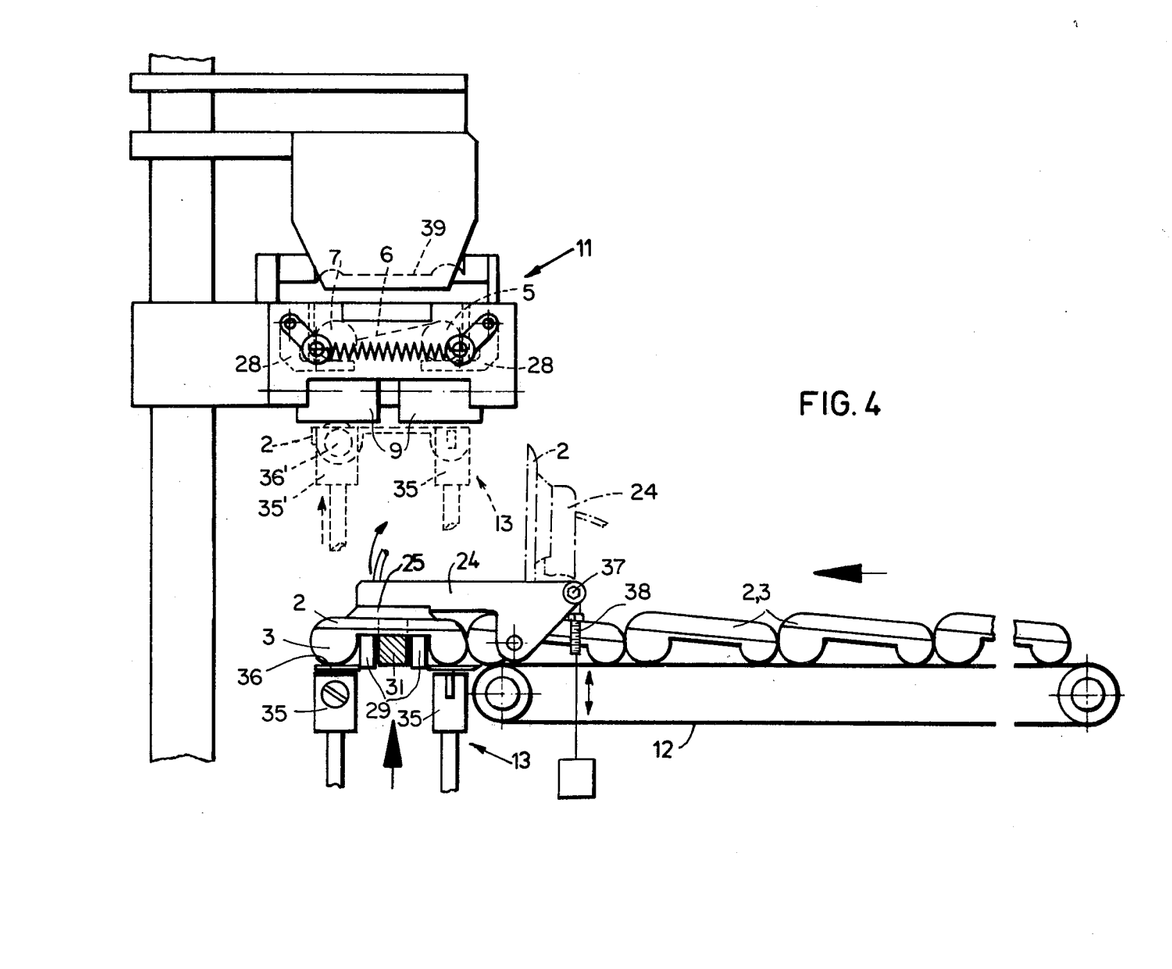
FIG. 4 shows a left side elevational view of the loading unit shown in FIG. 2.

FIG. 4 shows the belt 12, the positioning means 13, and a hinged lever 24 having a suction device 25 for engaging an upper cassette section 2, the lever 24 being located beneath the channel 11. The upper cassette section 2 and hinged lever 24 are shown in phantom outline rotated free of lower cassette section 3. Also positioning means 13 and lower cassette section 3 are shown in phantom outline in the raised position for reception of the roll of film 4.

Figure 5:
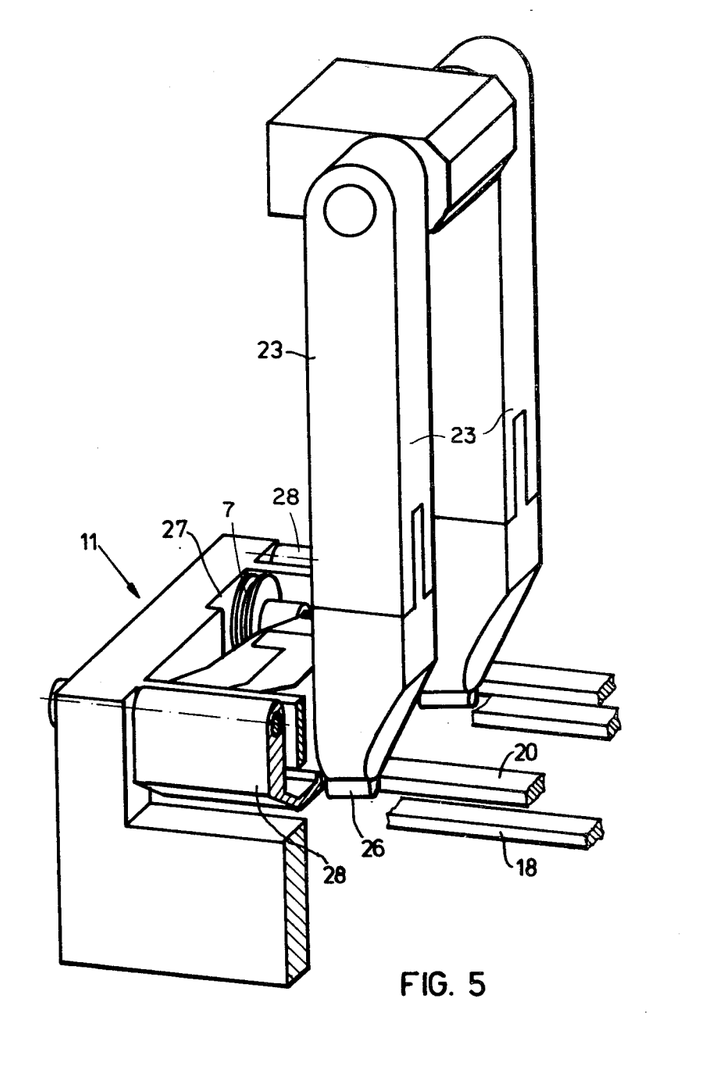
FIG. 5 shows a unit for inserting roll film.

FIG. 5 shows the lower and upper guide rails 18 and 20 and the retractable lever 23, which is provided with a catch 26, in front of the cut-away channel 11 with guides 27 and flaps 28.

Figure 6:
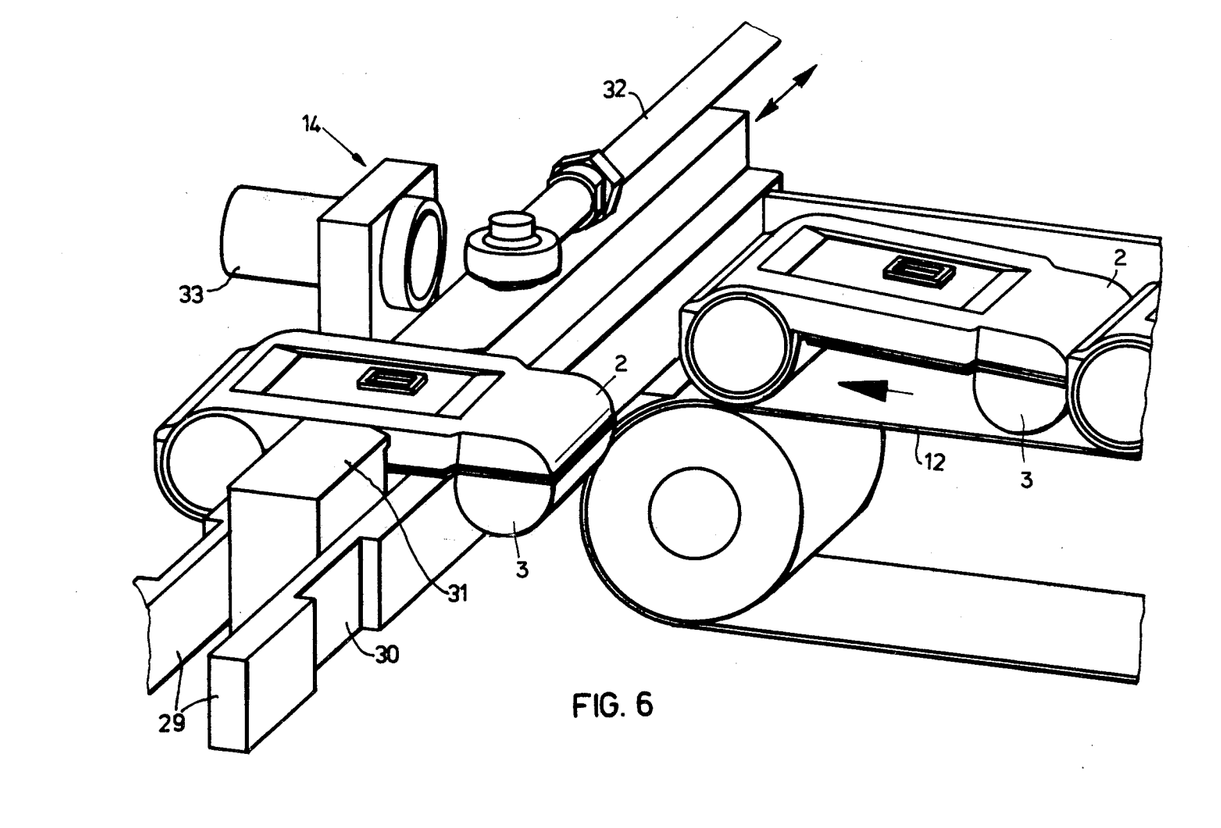
FIG. 6 shows a cassette supply line with transfer to positioning means.

FIG. 6 shows the separating means 14 for separating the cassettes 2, 3 at the end of the belt 12. The separating means 14 comprises lateral guide rods 29 with recesses 30 and a slide 31 received therebetween and provided with a push rod 32. A sensor 33 is provided to give trigger contact.

Figure 7:
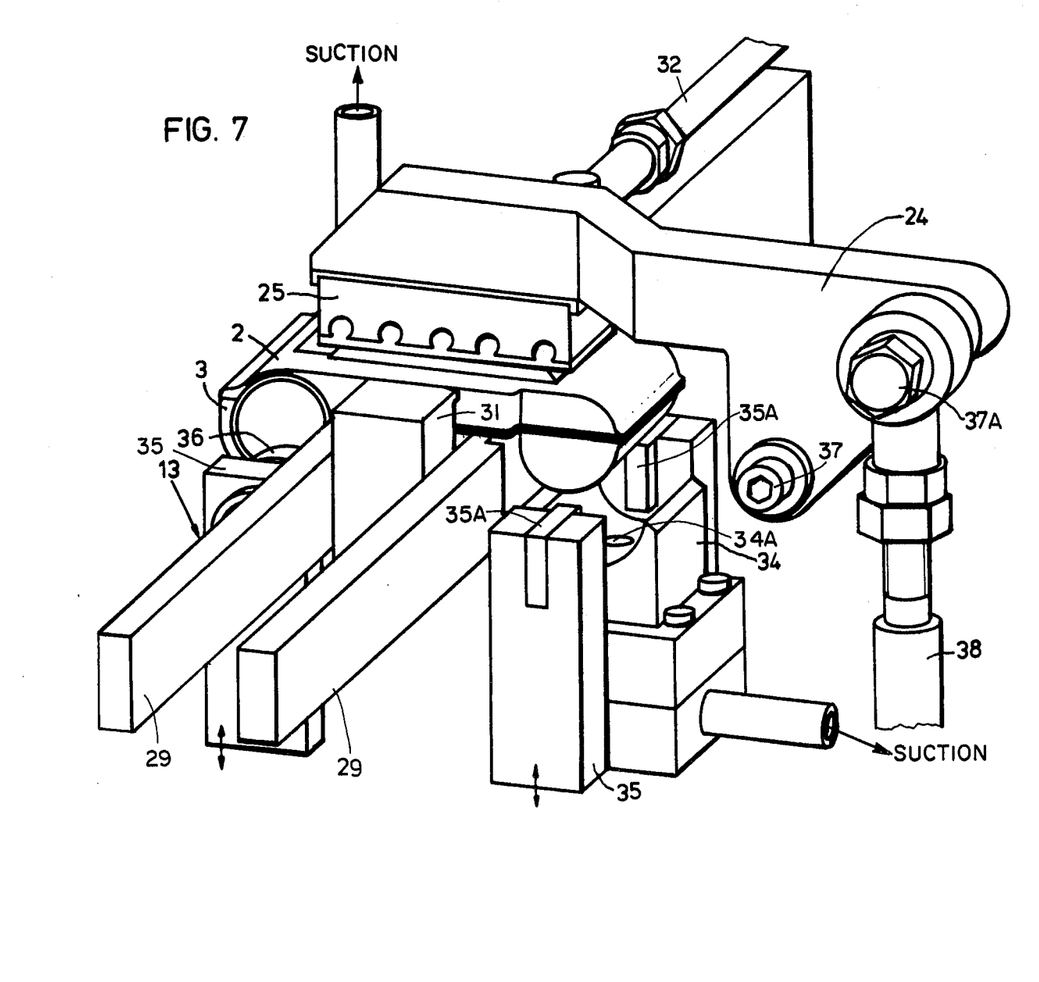
FIG. 7 shows a positioning means and handling of the upper section of cassette.

FIG. 7 shows the positioning means 13 which comprises a cassette take-up table 34, lateral guide columns 35 and spring-loaded catches 36 for spools, the positioning means 13 being arranged on both sides of the guide rods 29. FIG. 7 also shows the lever 24 which is pivotal mounted about a shaft 37A and pivotally actuated about shaft 37 by a draw rod 38, the suction device 25 being provided at the end of the lever 24 for lifting off the upper cassette section 2. The lower cassette section 3 is held by two suction devices 34A and 34B and positioned laterally at four points by catches 36 and position guides 35A. The spring-loaded catches 36 hold the spool after introduction into the cassette and guide the cassette laterally with the surfaces.

Figure 8:
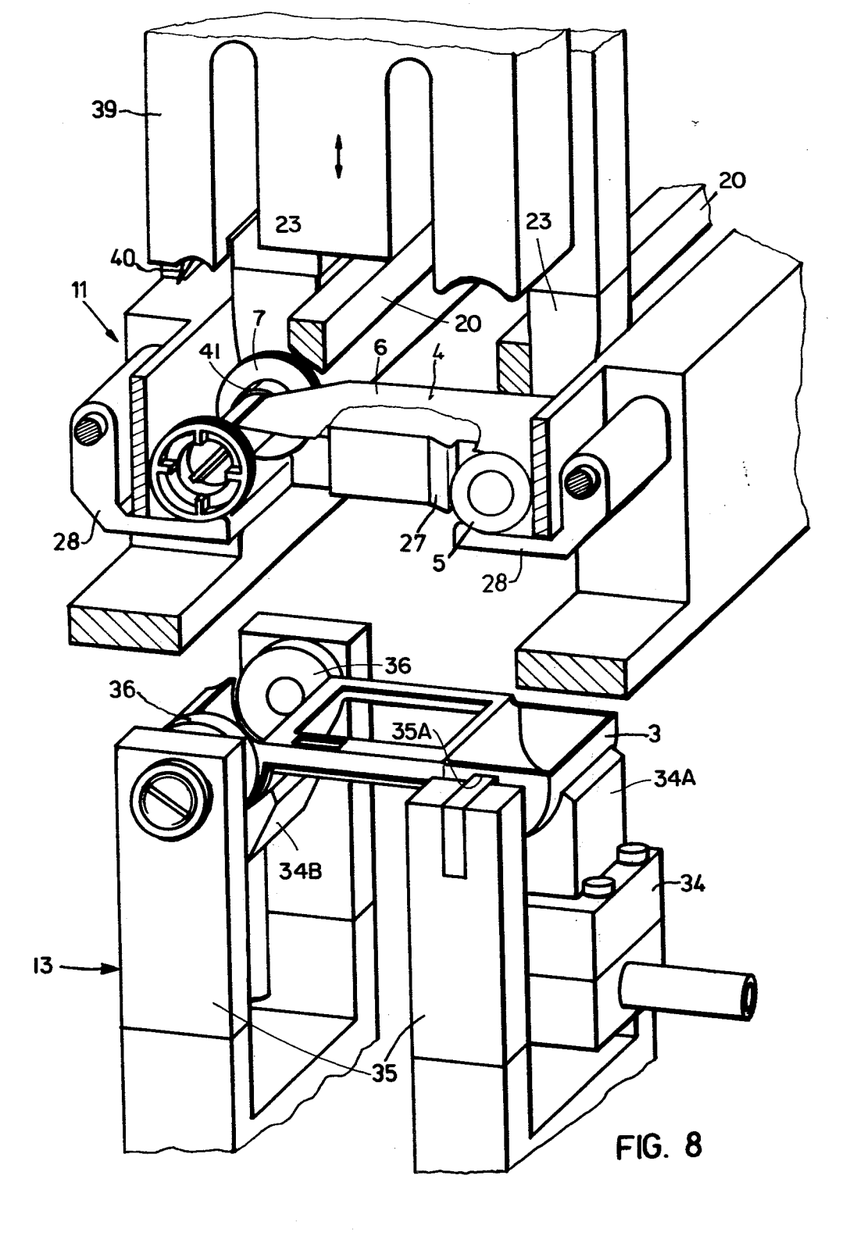
FIG. 8 shows a channel (cut away) with the positioning means.
Figure 9:
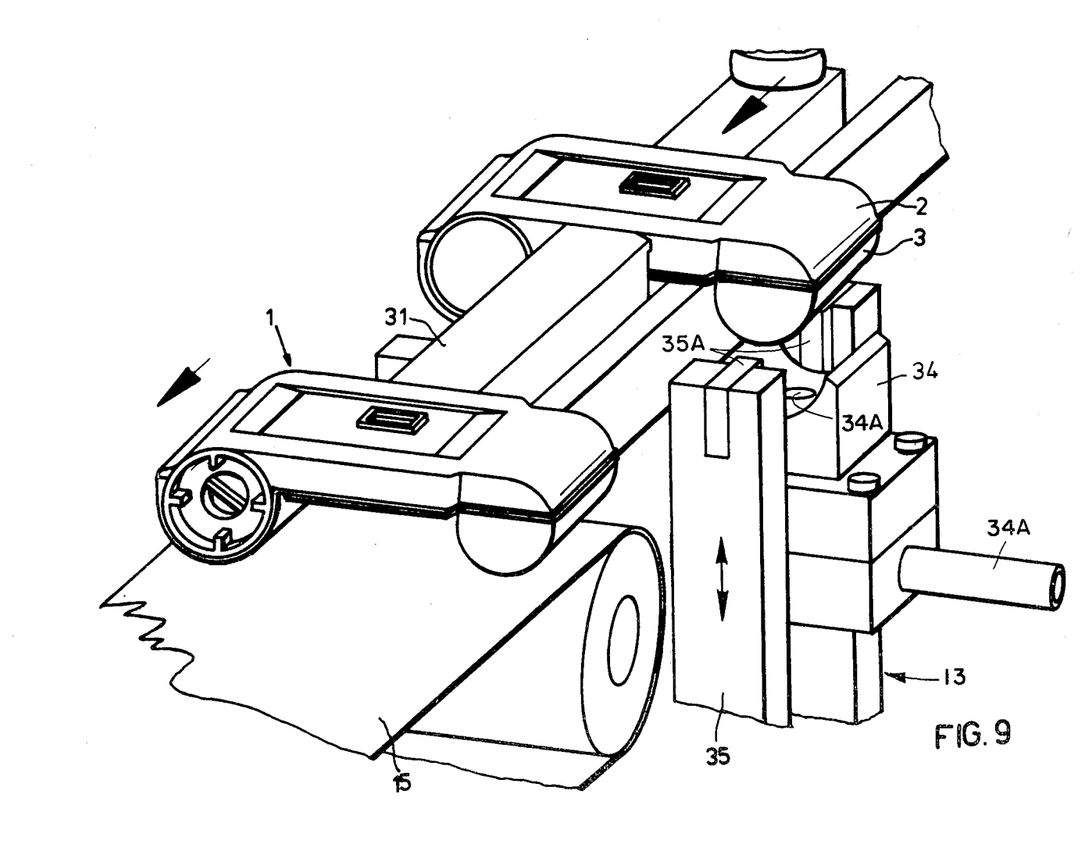
FIG. 9 shows delivery of filled cassettes.

FIG. 8 shows the positioning means FIG. 7/13 with the cassette take-up table 34, the lateral guide columns 35 and the spring-loaded catches 36 receiving the lower cassette section 3, beneath the channel 11 with the flaps 28, the guides 27 for the roll film 4, and a plunger 39. The plunger 39 is provided with a bevel 40 for a predetermined rotation of the spool.

FIG. 9 shows the slide 31 at the moment when a filled cassette 1 is ejected on to the belt 15 and an empty cassette 2, 3 is supplied to the positioning means which is still in its lower position.

The following steps are involved in inserting a roll film 4 into an empty cassette 2, 3, control being carried out by means of cams:

(1) The wound films 5 with spools 7 on paper leaders 6 are fed laterally and separately to the top of the channel 11 on the belt 9, through the action of the preliminary stop device 16 and the main stop device 17 which perform stop and release actions by the paper leader 6 pressing against the guide rods 18, 19 with the aid of a pusher member corresponding to the signals from the light barriers 21, 22. Insertion takes place by means of the pivotal retractable lever 23.

(2) The empty closed cassettes 2, 3 are separated at the end of the supply belt 12 by means of a slide 31 and are prepared for positioning beneath the channel 11 on two guide rods 29, causing the sensor 33 to emit a signal.

(3) The positioning means 13 rises. The lower cassette section 3 is positioned on the cassette take-up table 34 by the positioning guides 35A at the upper reaches of guide columns 35 and the spring-loaded catches 36. As the positioning means 13 continues to rise, the upper cassette section 2 presses against the suction device 25 which, after exerting a sucking effect, is pivoted upwards by the lever 24 so that the lower cassette section 3 which is open at the top lies beneath the channel 11.

(4) The roll film 4 moves into the open lower cassette section 3 when the plunger 39 is lowered and the flaps 28 pivot outwardly. The roll of film 4 is prevented from springing out or twisting by the fact that the edge of the paper leader 6 is folded up by means of guides 28 projecting into the transporting chamber on each side. The spool assumes a precisely defined position owing to the bevel 40 of the plunger 39 corresponding to the bevelled core 41. This position is then maintained by locking the spring-loaded catches 36 until the cassette is ejected.

(5) When the positioning means 13 is lowered, the upper cassette section 2 which is suspended on the suction device 25 pivots backwards and engages in the lower cassette section 3.

(6) As the positioning means 13 continues to descend, and after the spring-loaded catch has been released via slide cams (not shown), the cassette 1 is placed on the guide rods 29 and is ejected by the slide 31 on to the belt 15 to be carried away, and a fresh empty cassette 2, 3 is supplied with the same pushing operation.

We claim:

1. An automatic loading device for inserting roll film into cassettes having separable upper and lower sections comprising a conveyor for supplying roll films, a conveyor for supplying cassettes disposed below the conveyor for the roll films, a loading station having a channel means in the path of movement of the roll film conveyor for receiving roll films from the roll film conveyor, roll film dispenser means mounted between the roll film conveyor and the channel means for dispensing roll films from the conveyor to the channel means one at a time, the cassette conveyor being constructed and arranged to have its path of movement intersect a continuation of the channel means a short distance therefrom, a cassette positioning means disposed at the end of the cassette conveyor in line with the roll film channel means, a pair of holding flaps rotatably mounted at opposite sides of the channel means for releasably holding a roll film inserted into the channel means, cassette separating means mounted between the cassette positioning means and the channel means for removing the upper half of the cassette disposed on the positioning means, transport means connected to the positioning means for moving the cassette towards the channel means, the cassette separating means being constructed and arranged to remove the upper half of the cassette when the transport means moves the cassette on the positioning means towards the channel means and to hold it away from the positioning means until the roll film is inserted through the channel means into the lower half of the cassette, plunger means mounted in line with the channel means on the opposite side of the channel means from the positioning means, plunger moving means connected to the plunger means for moving the plunger means through the channel means against the roll of film whereby the roll film is discharged from the channel means through the flaps into the lower portion of the cassette, the transport means being also constructed and arranged to carry the lower portion of the cassette with roll film inserted in it past the cassette separating means to a discharge station, the cassette separating means being constructed and arranged to apply the upper half of the cassette over the lower half to close it with the roll film inserted in it, and discharge means at the discharge station for removing the loaded cassette from the positioning means to condition the positioning means for receiving a succeeding empty cassette from the cassette conveyor.

2. An automatic loading device as set forth in claim 1, wherein the roll film has a leader, and the flaps are narrow enough to contact the roll film in the region of the leader whereby it is prevented from unreeling as the roll film is inserted into the lower half of the cassette.

3. An automatic loading device as set forth in claim 1, wherein the roll film has at least one spool core, and the plunger has a finger extending therefrom for contacting the spool core to impart a slight rotation to it as it is loaded into the lower half of the cassette whereby the film is kept tightly wound against the spool core.

4. An automatic loading device as set forth in claim 1, wherein the roll film dispenser means comprises lever means adjacent the junction of the roll film conveyor with the channel means whereby the lever means ejects the roll films from its conveyor one at a time into the channel means.

5. An automatic loading device as set forth in claim 1, wherein suction holding means are provided in the positioning means and the separating means for grasping the sections of the cassette.

6. An automatic loading device as set forth in claim 1, wherein grasping fingers are mounted on the positioning means for contacting the roll film inserted into the lower half of the cassette being held on the positioning means for holding the roll film securely in place within the lower half of the cassette.

7. An automatic loading device as set forth in claim 1, wherein the cassette separating means includes a rotating arm and grasping means on the rotating arm for engaging and removing the upper sections.

* * * * *